United States Patent [19]
Anderson

[11] Patent Number: 5,978,461
[45] Date of Patent: Nov. 2, 1999

[54] TELEPHONE SWITCHING SYSTEM WITH INTERNAL AND EXTERNAL CHANNEL

[75] Inventor: James D. Anderson, Livonia, Mich.

[73] Assignee: Ground Zero Engineering, L.L.C., Farmington Hills, Mich.

[21] Appl. No.: 09/009,660

[22] Filed: Jan. 20, 1998

[51] Int. Cl.[6] .............................. H04M 1/60; H04M 1/66
[52] U.S. Cl. ......................... 379/168; 379/194; 379/199; 379/161; 379/156
[58] Field of Search .................................... 379/156, 157, 379/167, 170, 177, 183, 199, 200, 161, 168, 194

[56] References Cited

U.S. PATENT DOCUMENTS

| | | | |
|---|---|---|---|
| 3,651,274 | 3/1972 | Angner et al. ............................ | 179/19 |
| 3,931,478 | 1/1976 | Warman .................... | 179/37 |
| 4,554,411 | 11/1985 | Armstrong et al. ..................... | 379/167 |
| 4,578,540 | 3/1986 | Borg et al. .............................. | 379/200 |
| 5,425,089 | 6/1995 | Chan et al. .............................. | 379/177 |
| 5,454,032 | 9/1995 | Pinard et al. ............................ | 379/177 |
| 5,566,233 | 10/1996 | Liu ......................................... | 379/177 |
| 5,594,788 | 1/1997 | Lin et al. ................................. | 379/167 |

*Primary Examiner*—Paul Loomis
*Attorney, Agent, or Firm*—Gifford, Krass, Groh, Sprinkle, Anderson & Citkowski, P.C.

[57] ABSTRACT

A telephone switching system is provided for use with an external telephone line and a plurality of telephone extensions wherein each extension has a plurality of "touch tone" buttons which, when depressed, generate an audio signal unique to that button. The system includes at least one internal channel and at least one external channel wherein the external telephone line is connected to the external channel. An on-hook and off-hook detector is provided for each of the telephone extensions as well as a detector for detecting the presence of an incoming call on the external channel. A switching circuit is then responsive to an off-hook status of a first extension together with a coded audio signal generated by the buttons at the first extension to either (1) selectively and exclusively connect the first extension to a selected second extension determined by the coded audio signal to the internal channel and to generate a ring signal to the second extension, or (2) connect the first extension to the external channel. The switching circuit is also responsive to a coded audio signal to transfer an incoming call from the first extension to a selected second extension. Other features, including area code lockout features and placing an external call on hold, are also disclosed.

15 Claims, 9 Drawing Sheets

TELEPHONE SWITCHING SYSTEM WITH INTERNAL AND EXTERNAL CHANNEL

BACKGROUND OF THE INVENTION

I. Field of the Invention

The present invention relates to a telephone switching system connected to a plurality of telephone extensions for selectively connecting the extensions to each other and/or an external telephone line.

II. Description of the Prior Art

There are many previously known telephone switching systems, commonly called PBX systems, for selectively directing incoming telephone calls to a selected telephone extension in the telephone system. These previously known systems, however, all suffer from a number of common disadvantages. One disadvantage of these previously known systems is that such systems are expensive to obtain and maintain. While the expense of such systems is acceptable in many business settings, such telephone switching systems are economically infeasible for a home telephone system.

A still further disadvantage of these previously known telephone switching systems is that, upon a loss of power to the system, the entire system becomes inoperable and thus incapable of either receiving or sending telephone calls onto an external telephone line.

SUMMARY OF THE PRESENT INVENTION

The present invention provides a telephone switching system which is especially designed for a residential setting and which overcomes all of the above-mentioned disadvantages of the previously known devices.

In brief, the telephone switching system of the present invention is provided for use in a residential setting or the like having a plurality of telephone extensions wherein each telephone extension has a plurality of "touch tone" buttons which, when depressed, generate an audio signal unique to that button. At least one external telephone line is also connected to the system of the present invention.

The telephone switching system of the present invention further comprises at least one, and preferably three, internal channels as well as one external channel wherein the external telephone line is connected to the external channel. The system, which is preferably microprocessor based, also includes means for detecting an on-hook and off-hook status for each of the telephone extensions as well as means for detecting an incoming call on the external line.

The present invention allows the telephone extensions to be used as an intercom system. Specifically, microprocessor controlled switching means are responsive to both an off-hook status of a first extension in the system and a coded audio signal generated by the buttons at the first extension to selectively and exclusively connect the first extension to a selected second extension as determined by the coded audio signal from the first extension. Both extensions are connected to the internal channel for the system and a ring signal is generated to the second extension. Alternatively, the switching system connects the first extension to the external telephone line for normal telephone dialing and simultaneously connects all of the other extensions in the system to an internal channel.

The switching circuit also includes means for transferring an incoming call from a first answering extension to a second extension in the system as determined by the audio code entered at the first or answering extension.

Still other features of the present invention include means for storing a lockout table of unauthorized telephone numbers and/or unauthorized telephone area extension codes and to automatically connect the calling extension to an internal channel upon an attempt to dial an unauthorized telephone number or telephone area code. Still other features of the telephone system of the present invention include means for placing an external call on hold and thereafter connecting the call on hold to a second telephone extension. Still other features of the system of the present invention will become apparent in the following detailed description of the invention.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
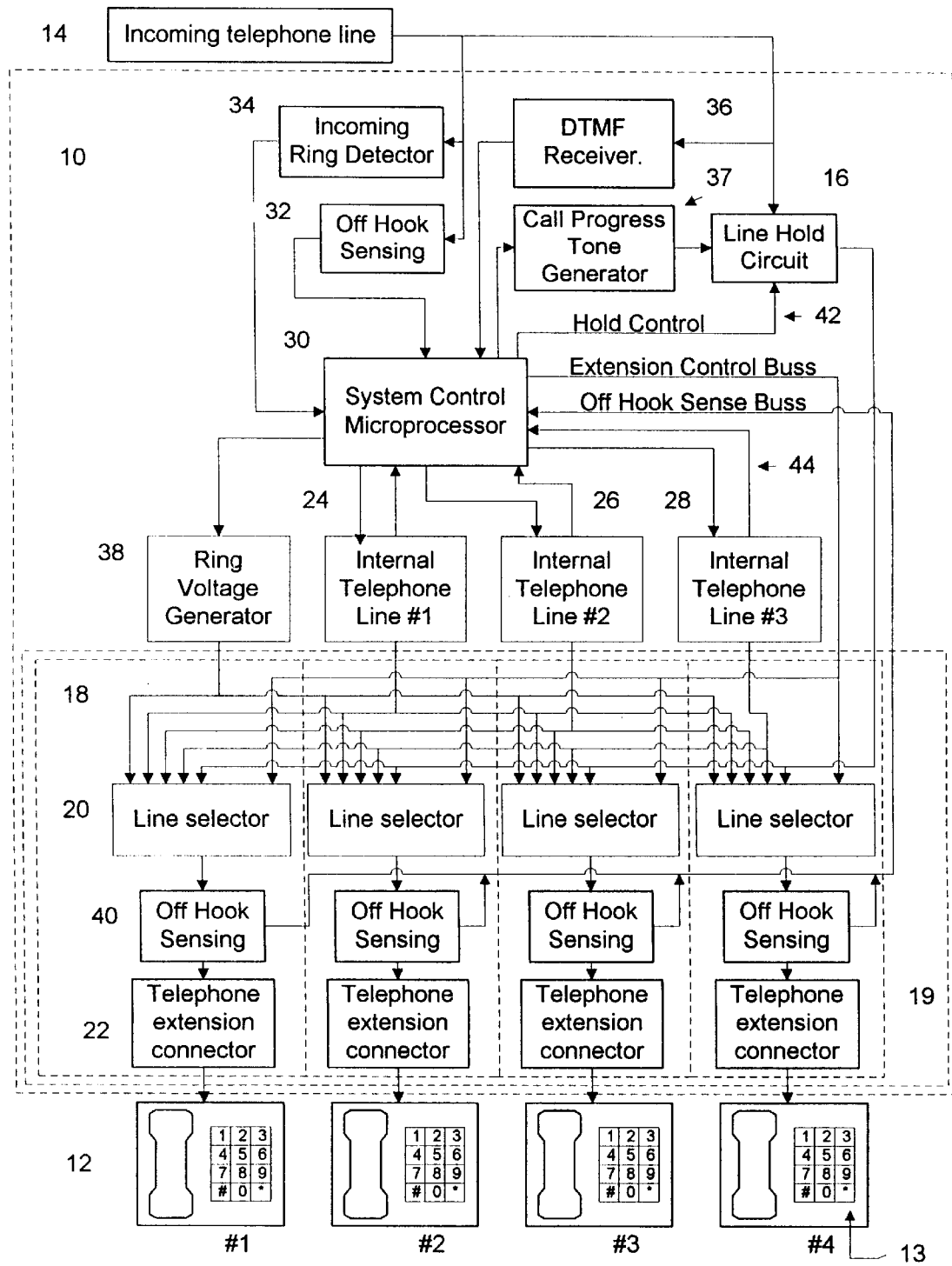
FIG. 1 is a block diagrammatic view illustrating a preferred embodiment of the present invention.

With reference first to FIG. 1, a block diagrammatic view of the telephone switching system 10 of the present invention is there shown having a plurality of telephone extensions 12, four of which are shown. Each telephone extension 12, furthermore, has a plurality of conventional "touch tone" buttons 13, each of which generates a unique audio code dependent upon the button 13 depressed. The construction of the extensions 12, together with the touch tone buttons, however, is conventional so that a further description thereof is unnecessary.

An external telephone line 14 is connected through a line hold circuit 16 in parallel to a plurality of interface modules 18 wherein one interface module 18 is associated with each telephone extension 12. Each interface module 18, furthermore, includes a line selector relay circuit 20 connected in series between the external telephone line 14 and a conventional telephone extension connector 22 associated with each extension 12.

In a fashion which will be subsequently described in greater detail, each line selector relay circuit 20 selectively connects is associated telephone extension connector 22, and thus its associated telephone extension 12, to either the external telephone line 14, which forms an external channel, or to one of three internal channels 24, 26 and 28 contained within the system 10. In order to control the operation of the line selector relay circuits 20, and thus the selective connection of the telephone extensions 12 to either the external channel 14 or the internal channels 24–28, the system 10 includes a microprocessor 30. The microprocessor 30, furthermore, receives a number of incoming signals on its input ports as well as generates a number of output signals to control the operation of the line selector relay circuits 20, the hold circuit 16 and other circuits.

More specifically, the microprocessor 30 receives an on and off-hook sensing signal from the off-hook sensing circuit 32 as well as a ring signal from an incoming ring detector circuit 34, both of which are connected to the external channel 14. Similarly, the microprocessor receives an input signal from a DTMF receiver 36. The off-hook sensing circuit 32, ring detector circuit 34 and DTMF receiver 36 are all conventional in construction.

The microprocessor 30 also generates output signals to each of the line selector relay circuits 20 as well as to a ring voltage generator 38 which is also connected to each of the relay circuits 20. The microprocessor 30 also receives an off-hook sensing signal from each of the interface modules 18 from an off-hook sensing circuit 40 associated with each interface module 18 indicative of the on or off-hook status of the extension 12. The microprocessor 30 also controls the operation of line hold circuit 16 by generating appropriate control signals on control line 42.

Still referring to FIG. 1, each of the internal channels 24–28 includes a telephone tone generator and DTMF receiver which are used to generate dial tones under microprocessor control on the internal channels 24–28 as well as decode incoming audio signals from the various telephone extensions 12. Appropriate control lines 44 extending between the microprocessor 30 and the internal channels 24–28 are utilized to control the operation of these tone generators and DTMF receivers. The microprocessor 30 under program control thus selectively connects the telephone extensions 12 to each other via an internal channel 24–28, or the external channel on line 14. The microprocessor 30 also selectively generates ring signals to the telephone extensions 12.

A detailed description of the operation of the telephone system 10 of the present invention will be shortly described. However, in brief and assuming that the system is idle, upon receipt of an incoming telephone call, all telephone extensions 12 are connected with the external channel 14 so that all telephone extensions ring. Assuming such a ring condition and that one of the extensions 12 is lifted, the off-hook sensing circuit 40 associated with that extension 12 generates a signal to the microprocessor 30 and also switches all the other extensions to the first available internal channel 24–28.

In the event that transfer of the incoming call from the receiving extension 12, i.e. the extension 12 that was taken off hook in response to the ring signal, that receiving extension can then generate an audio code to the central station of the desirability of transferring the call to another or second extension 12. The microprocessor 30 then generates the appropriate control signals to the interface module 18 of the desired transferee extension 12 of the call as well as generates the appropriate ring signal to the desired transferee extension 12.

Since the system of the present invention includes three internal channels, these internal channels may be used as intercom connections between telephone extensions 12 in the system even while another extension is engaged in an outside telephone call via the external channel or line 14.

Figure 2A:
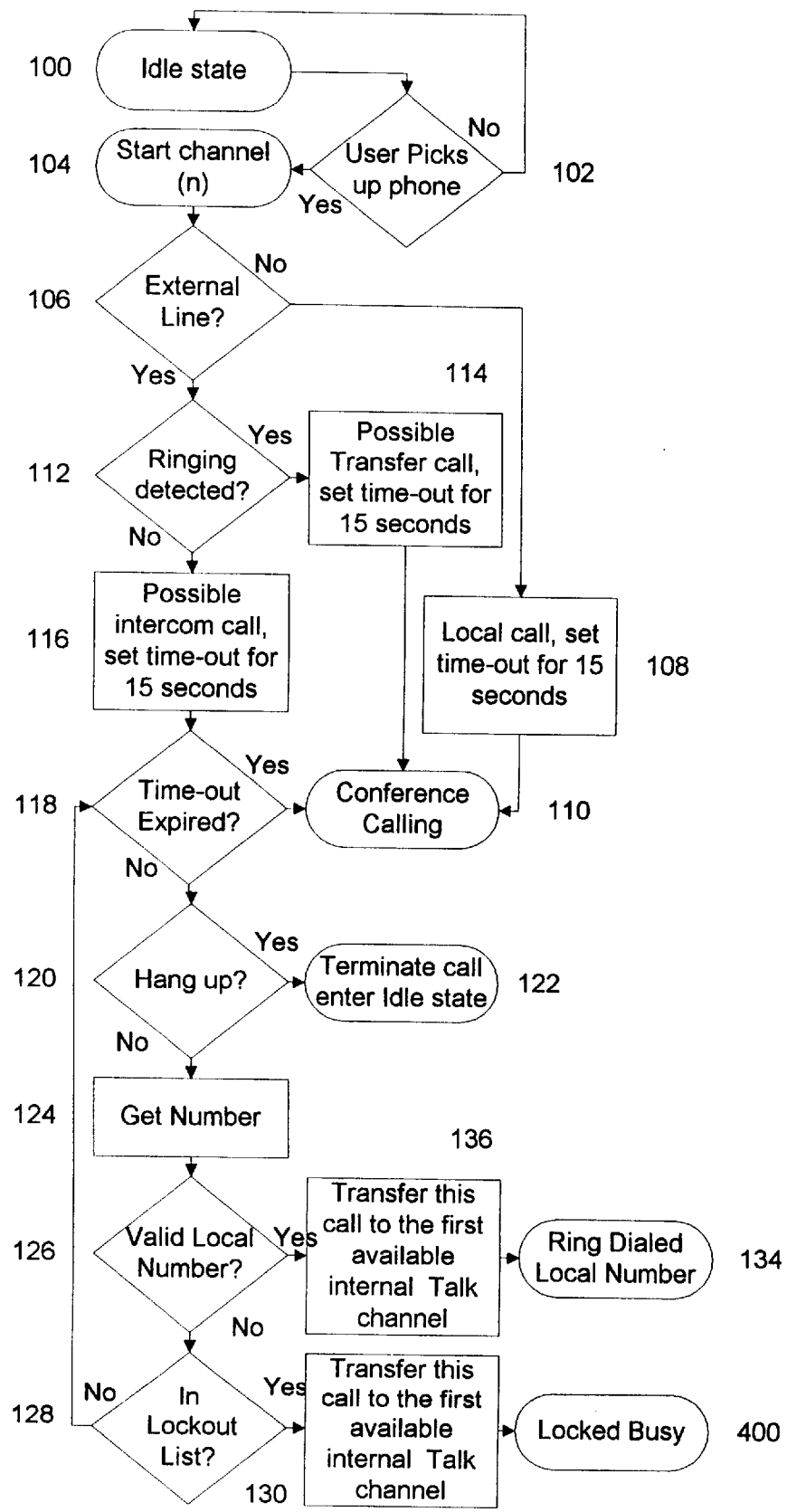
FIGS. 2a–2h are all flow charts illustrating the operation of the preferred embodiment of the present invention.

With reference then to FIG. 2a, the operation of the present invention will now be described in detail. Assuming that the telephone system 10 is in an idle state, i.e. there is no incoming telephone call and all telephones are on hook, step 100 branches to step 102 to determine whether an off-hook status exists at any of the telephone extensions 12 by reading the signal from the off-hook sensing circuit 40 (FIG. 1). Assuming that all extensions 12 are on hook, step 102 branches back to step 100 where the above process is repeated.

Figure 2B:
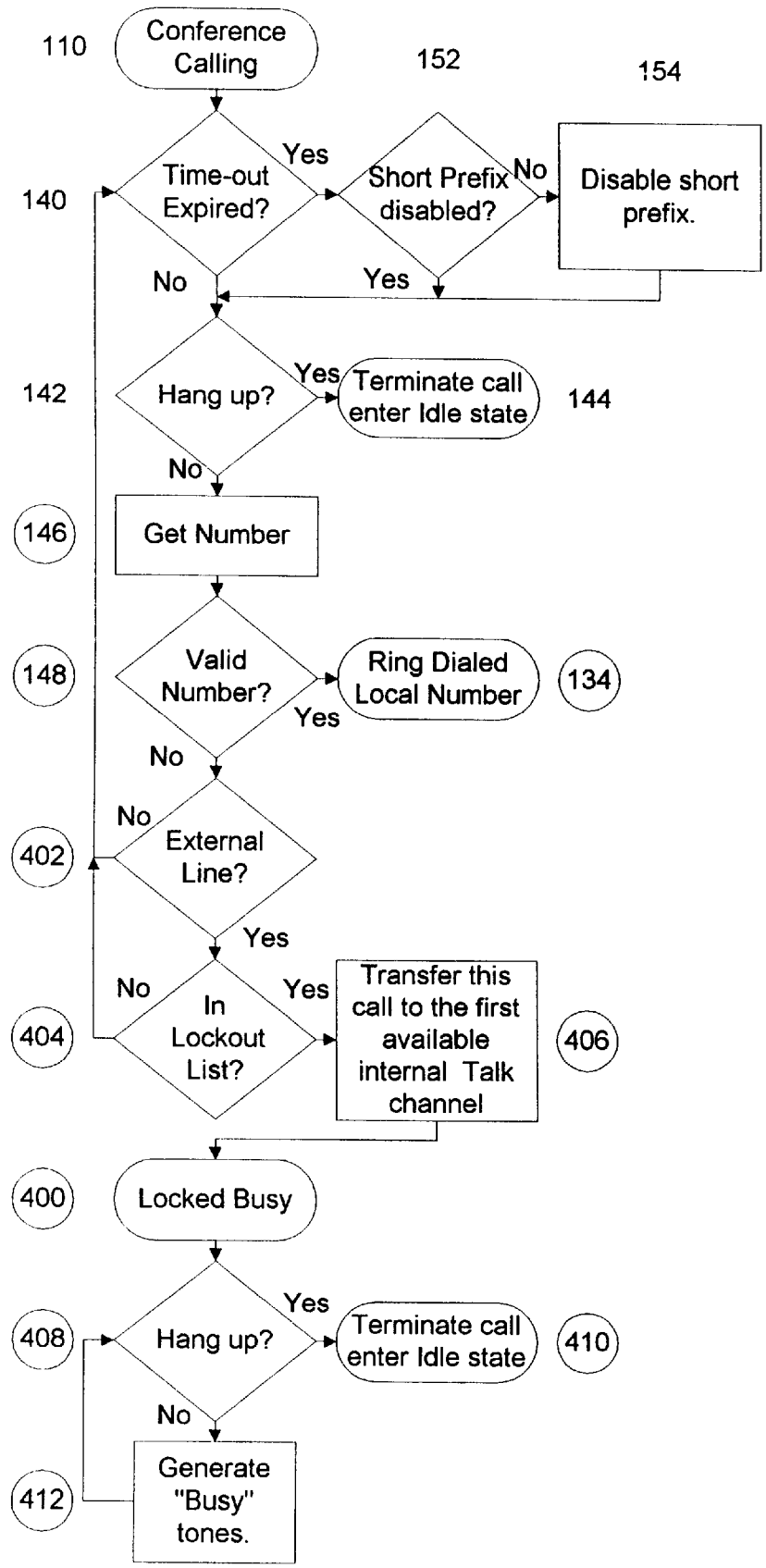

Assuming, however, that one of the extensions is moved to an off-hook status, step 102 instead branches to step 104 which sets the value of a start channel parameter N and then branches to step 106. At step 106, the program determines whether or not the off-hook signal is on the external channel. If not, step 106 branches to step 108 which sets a fifteen second time out variable and step 108 then branches to a conference calling routine 110 (FIG. 2b).

Conversely, if the off hook is detected on the external line, step 106 instead branches to step 11 which determines if a ring is detected from the ring detector circuit 34 (FIG. 1). If so, indicative of a possible transfer call, step 112 branches to step 114 which also sets the time out variable to fifteen seconds and then branches to the conference calling routine 110.

Conversely, if a ring is not detected, indicative of a possible intercom call, step 112 instead branches to step 116 and sets a time out variable to fifteen seconds. Step 116 then branches to step 118.

Step 118 determines if the time out has expired. If so, step 118 branches to conference calling routine 110. Otherwise, step 118 branches to step 120 which determines if the telephone extension has hung up, i.e. an on-hook condition. If so, step 120 branches to step 122 which terminates the call and re-enters the idle state at step 100.

Assuming that the telephone receiver has not hung up, step 120 instead branches to step 124 at which the microprocessor 30 reads the coded audio signal from the receiver at the extension by inputting the output signal from either the DTMF receiver 36 or the DTMF receiver associated with each of the internal channels 24–28. Step 124 then branches to step 126.

At step 126, the system determines if the coded number inputted at step 124 represents a valid local number. If not, step 126 branches to step 128 which determines if the inputted number at step 124 is in a lockout list. The lockout list represents a stored table accessible by the microprocessor 30 of unauthorized telephone calls or telephone area codes. For example, the user of the system can elect to lock out all calls to area code 900 telephone numbers. Thus, if step 128 detects that the inputted number at step 124 is in the lockout list, step 128 branches to step 130 which transfers the call to the first available internal channel 24–28 by the microprocessor 30 generating a control signal to the line selector relay circuit 20 of the calling extension 12 thus effectively disconnecting the call from the external channel 14. Step 130 then branches to step 400 (FIG. 2b) which will be later described.

Conversely, if step 126 detects that a valid local number has been entered, step 126 branches to step 136 which transfers the extension to the first available internal channel 24–28 and then branches to step 134.

In the event that the inputted number is not a valid local number (or no number for that matter) and not on the lockout list at step 128, step 128 branches back to step 118 and reiterates the foregoing procedure until the fifteen second time out has expired. As previously described, step 118 then branches to the conference calling routine 110.

As thus far described, in response to an off-hook status or condition of any extension, the program either enters the conference calling (which will be shortly described with reference to FIG. 2b), or will ring a local different extension in the event that a valid coded audio input is inputted at the telephone extension which has gone off hook.

With reference now to FIG. 2b, the conference calling routine 110 is there shown. Each telephone extension 12 in the telephone system 10 has both a short and long unique code associated with it. For example, one telephone extension may have a short code "#2" associated with it and a long code "##02" also associated with it.

With reference then to FIG. 2b, conference calling routine 110 first branches to step 140 which determines if the time out set by either step 108 or 116 in FIG. 2*a* has expired. If not, step 140 branches to step 142 which determines if the telephone extension has hung up by inputting the signal from the off-hook sensing circuit 40 and, if so, terminates the call at step 144.

Figure 2C:
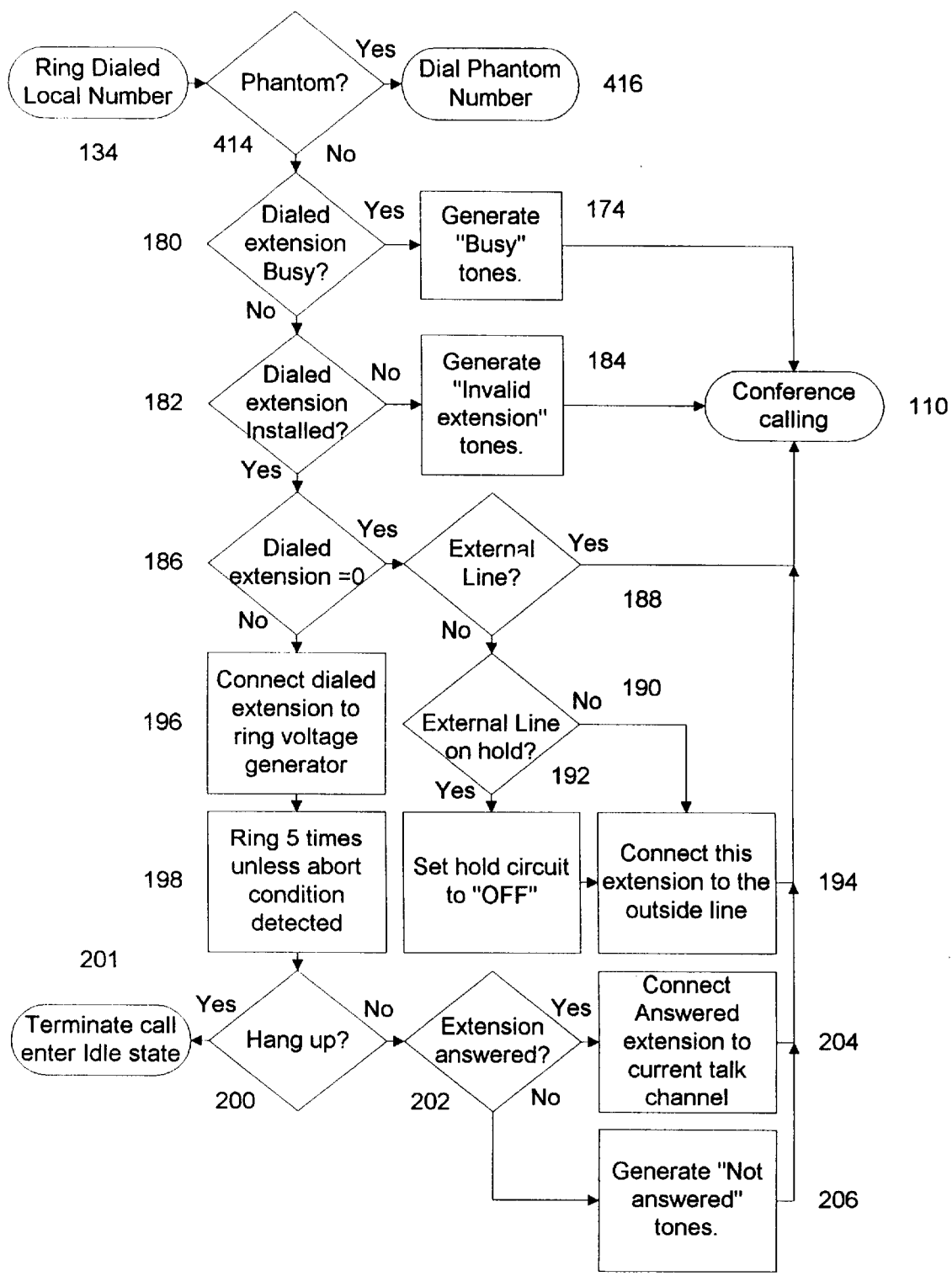

Otherwise, step 142 branches to step 146 which inputs the audio coded signal, if any, from the telephone extension and then branches to step 148. At step 148 the program determines if a valid number has been entered. If so, step 148 branches to the ring dialed local number routine 134 (FIG. 2*c*). Otherwise, step 148 branches to step 402 which determines whether an external line is in use. If not, step 402 branches back to step 140 and the above process is repeated.

If an external line is used, step 402 branches to step 404 which determines if the number is in the lockout list. If not, step 404 branches to step 14 and the above process is repeated.

Conversely, if the number is in the lockout list, step 404 branches to step 406 which, like step 130 (FIG. 2*a*), transfers the call to the first available internal channel and then to step 400 where a locked busy flag is set. Step 400 then branches to step 408 which tests for a hang up condition by inputting the signal from the off hook sensing circuit 40 associated with the extension. Step 408 continuously iterates through step 412 which generates a business tone until a hang up condition is detected at which time the program enters the idle step via step 410.

Assuming that the fifteen second time out set by steps 116 and 108 has expired, step 140 instead branches to step 152 which determines if the short code has been disabled. If so, step 152 branches to step 142. Otherwise, step 152 branches to step 154 which disables the short code or prefix and step 154 then branches back to step 142.

Consequently, the conference calling routine illustrated in FIG. 2*b* allows the short code or short prefix associated with any particular extension to be used for a limited period of time, e.g. fifteen seconds as set by steps 108 and 116 in FIG. 2*a*, after an off-hook status is detected. After expiration of this limited time, however, the ability to utilize the short prefix is disabled by step 154 so that, in order to interconnect extensions 12 or transfer to a different extension 12, the long code or long prefix must be entered. This provision, furthermore, allows the short prefix to be used for a short period immediately following the telephone pick up or off-hook signal, and yet prevents unintended disconnection of the telephone extension by inadvertently entering a short code after expiration of the time out period.

Although steps 140–148, 402 and 404 continuously iterate and monitor the telephone line for a proper valid extension number at step 148, it will be understood that entry of an extension number is not required. For example, during a typical operation of the telephone in which the telephone extension 12 is moved to an off-hook condition in response to a ring signal from the external telephone line 14, the telephone extension 12 is connected to the external line 14. Thereafter a telephone conversation is conducted without either the necessity or desirability of transferring the telephone call to a different telephone extension. In this event, steps 140–148 will simply continuously iterate until the completion of the telephone call and termination at step 144.

With reference now to FIG. 2*c*, FIG. 2*c* represents the ring dialed local number routine where a valid local number has been dialed and detected at either step 134 (FIGS. 2*a* and 2*b*). Step 134 immediately branches to step 414 which determines if a phantom extension number has been entered. If so, step 414 immediately branches to the phantom number routine 416 (FIG. 2*d*) and then to step 160 which determines if the dialed number equals a predefined hold extension number. Hold is a phantom extension maintained by the telephone system. If so, step 160 branches to step 162 which determines if the channel is the external channel 14 or one of the internal channels 24–28. If the external channel 14, step 162, branches to step 164 in which the microprocessor 30 generates an output signal on line 42 to the line hold circuit 16 (FIG. 1) to place the external line on "full hold" by activating the line hold circuit 16 (FIG. 1). Step 164 then branches to step 166 which switches the call to the first available internal channel 24–26.

Conversely, if the channel is not the external channel, step 162 instead branches to step 418 which then determines if the hold circuit 16 is already in the full hold position. If not step 428 branches to 420 which then disables local call waiting on current internal channels 24–28 and then branches to 110 conference call. Conversely, if 418 determines the hold circuit 16 is in full hold position then 418 branches to step 168 in which the microprocessor 30 generates an output signal to the line hold circuit 16 on output line 42 (FIG. 1) terminating the call on hold and then enters the conference calling routine 110 (FIG. 2*b*). Thus, steps 160–166 enable an external call to be place on "hold" and then transferred to a different extension.

Assuming that the dialed number is not the hold extension, step 160 instead branches to step 170 which determines if the dialed extension is a special extension number reserved for programming the system 10. If so, step 170 branches to step 172 which determines if the extension is on the external channel. Step 172 only enables programming of the system to occur through an internal channel 24–28. Consequently, if the channel is an external channel or is not the programming phantom extension, step 172 branches to step 422 in which the microprocessor 30 generates a busy signal via the tone generator 37 and then exits to the conference calling routine 110 (FIG. 2*b*).

Assuming, however, that the extension is on an internal channel, step 172 instead branches to step 176 which determines if the program mode is busy since only a single extension 12 can be used to program the system at any one time. Thus, if a different extension is currently engaged in programming the system, step 176 branches to step 422 to generate the busy signals in the previously described fashion. Otherwise, step 176 exits to step 178 and then enters the programming menu which will be subsequently described in reference to FIG. 2*e*.

Referring again to FIG. 2*c*, assuming that the dialed extension is not a phantom extension number, step 414 instead branches to step 180 which determines if the dialed extension is busy. If so, step 180 branches to step 174 to generate the busy tones and then to the conference calling routine 110 in the previously described fashion. Otherwise, if the dialed extension is not busy, step 180 branches to step 182.

At step 182, the program determines if the dialed extension is installed in the system. If not, step 182 branches to step 184 in which the system generates an "invalid extension" tone through either the tone generator 37 or the tone generators associated with each of the internal channels 24–28. Step 184 then branches to conference calling 110 (FIG. 2*b*).

The telephone system 10 of the present invention also allows one telephone extension 12 to "break" into a conversation on the external line 14. Thus, assuming that the dialed extension is a valid installed extension number, step 182 then branches to step 186 in which the program determines if the dialed extension is a special extension number to allow break in. If so, step 186 branches to step 188 to determine if the extension is on an external line. If so, step 188 branches to conference calling routine 110. If not, step 188 branches to step 190 which determines if the external line is on hold. If so, step 190 branches to step 192 to set the line hold circuit 16 to off and then to step 194 to connect the extension to the outside line and then to the conference calling routine 110. Conversely, if the external line is not on hold, step 190 branches directly to step 194 and then the conference calling routine 110.

If none of the conditions tested by steps 160 (FIG. 2d), 170, 180, 182 and 186 are true, the extension has entered a valid intercom extension number. When this happens, step 186 branches to step 196 where the microprocessor 30 connects the dialed extension to the ring voltage generator 38 (FIG. 1) and then branches to step 198 to ring the dialed number a predetermined number of times, for example five times. Step 198 then branches to step 200 which determines if a hang up condition has occurred. If so, step 200 branches to step 201 which terminates the call and returns to the idle state at step 100.

Assuming that a hang up condition has not occurred, step 200 branches to step 202 which determines if the dialed extension has been answered. If so, step 202 branches to step 204 which connects the answered extension to the current channel 24–28 on the outside line 14 and then to the conference calling routine 110. Otherwise, step 202 branches to step 206 which generates a "not answered" tone to the calling extension.

Figure 2D:
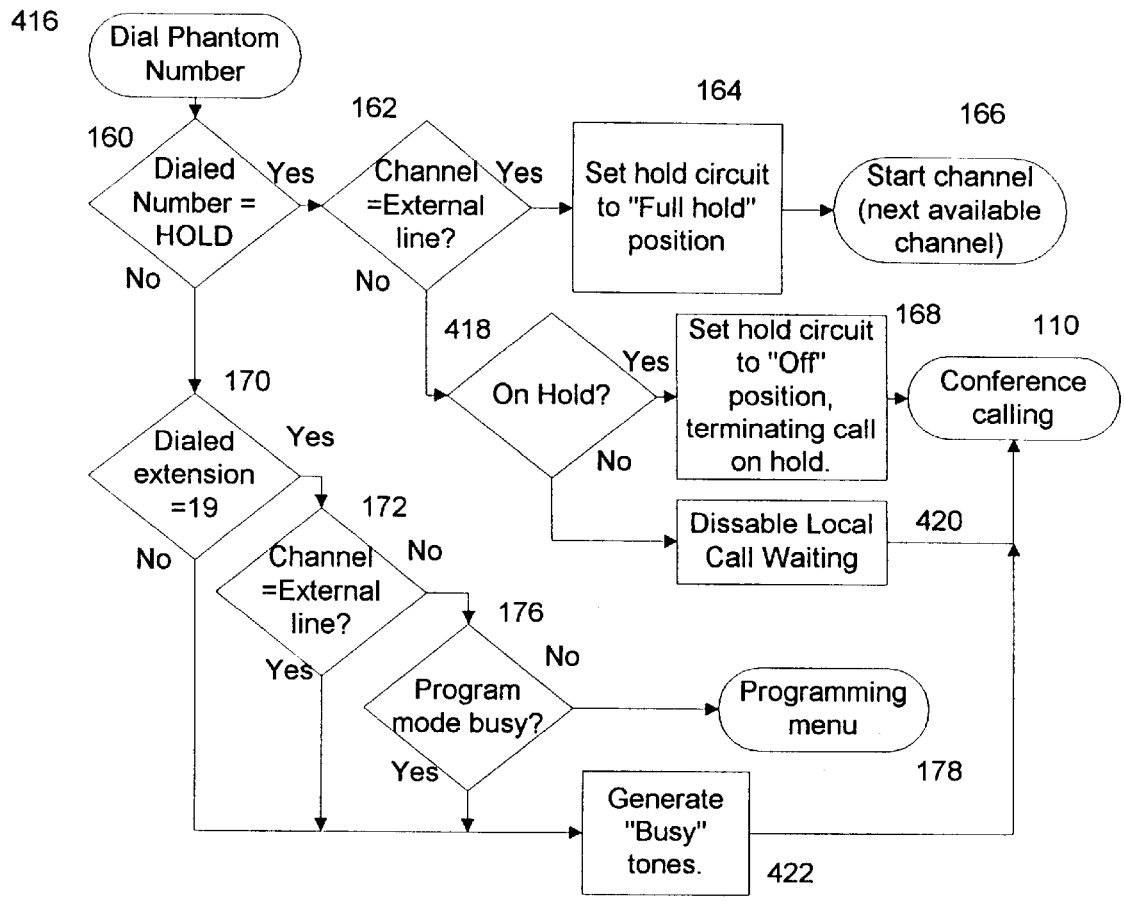
Figure 2E:
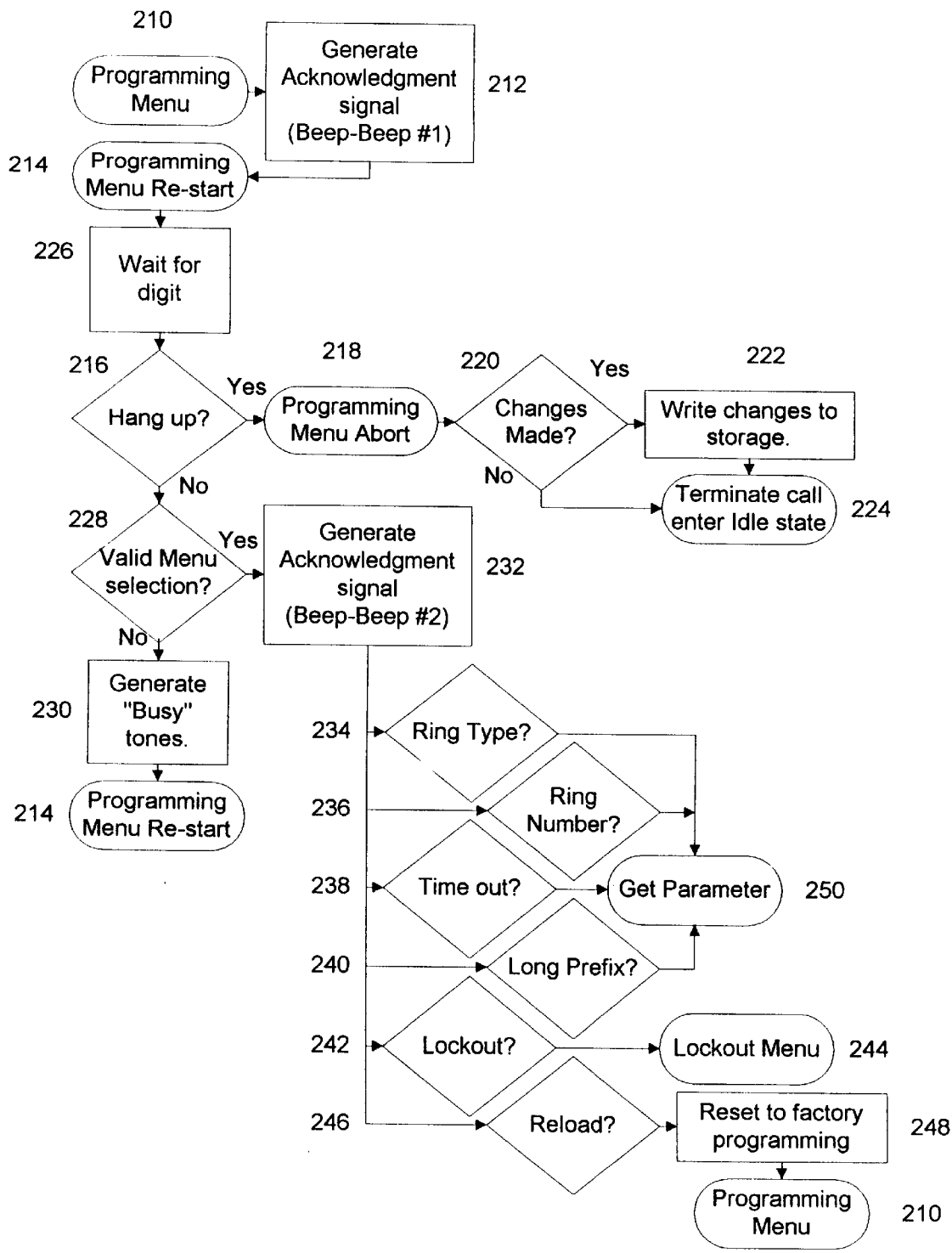

With reference now to FIG. 2e, the programming menu routine 210 is there shown in greater detail. As will be shortly described in greater detail, the programming menu allows a number of different features and capabilities of the system to be programmed by the user.

The programming menu routine 210 immediately branches to step 212 which generates an audio acknowledgment signal to the programming extension 12. Step 212 then branches to step 214 where the actual programming is initiated.

Step 214 branches to step 226 which waits for a digit or a hang-up as described in FIG. 2e upon a digit or a hang up. Step 226 then branches to step 216 to determine if the programming extension has hung up. If so, step 216 branches to step 218 which aborts the programming menu. Step 218 then branches to step 220 which determines if any changes have been made to the programmable features of the system 10. If so, step 220 branches to step 222 which stores the changes made during the programming by the extension 12 and then branches to step 224 to terminate the call and enter the idle state at step 100. If no changes were made, step 220 instead branches directly to step 224.

Assuming that the telephone receiver has not been hung up, indicative that the programming is occurring, step 216 branches to step 226 in which the program enters the programming entry from the programming extension 12. Step 226 then branches to step 228 which determines if a valid menu selection has been entered. If not, step 228 branches to step 230 where a busy tone is generated to the extension attempting to program and step 230 then branches back to the menu restart at step 214.

Assuming that a valid menu entry has been entered, step 228 instead branches to step 232 which generates an acknowledgment signal to the telephone extension. Step 232 then branches to the desired menu selection. For example, at step 234 the type of ring can be set by the user. At step 236, the number of rings used, for example, at step 198 (FIG. 2c) can be set by the user. At step 238 the time out period set at steps 116 and 108 (FIG. 2a) can be set by the user while the long prefix, as opposed to short prefix (see FIG. 2b) can be set by user at step 240. Step 242 selects the lock out selection which then branches to lock out menu 244. Lastly, step 246 is a menu selection indicative of a reload at step 248 to preset factory parameters. This typically would be used when the user wants to start over anew in setting the programmable system parameters.

Figure 2F:
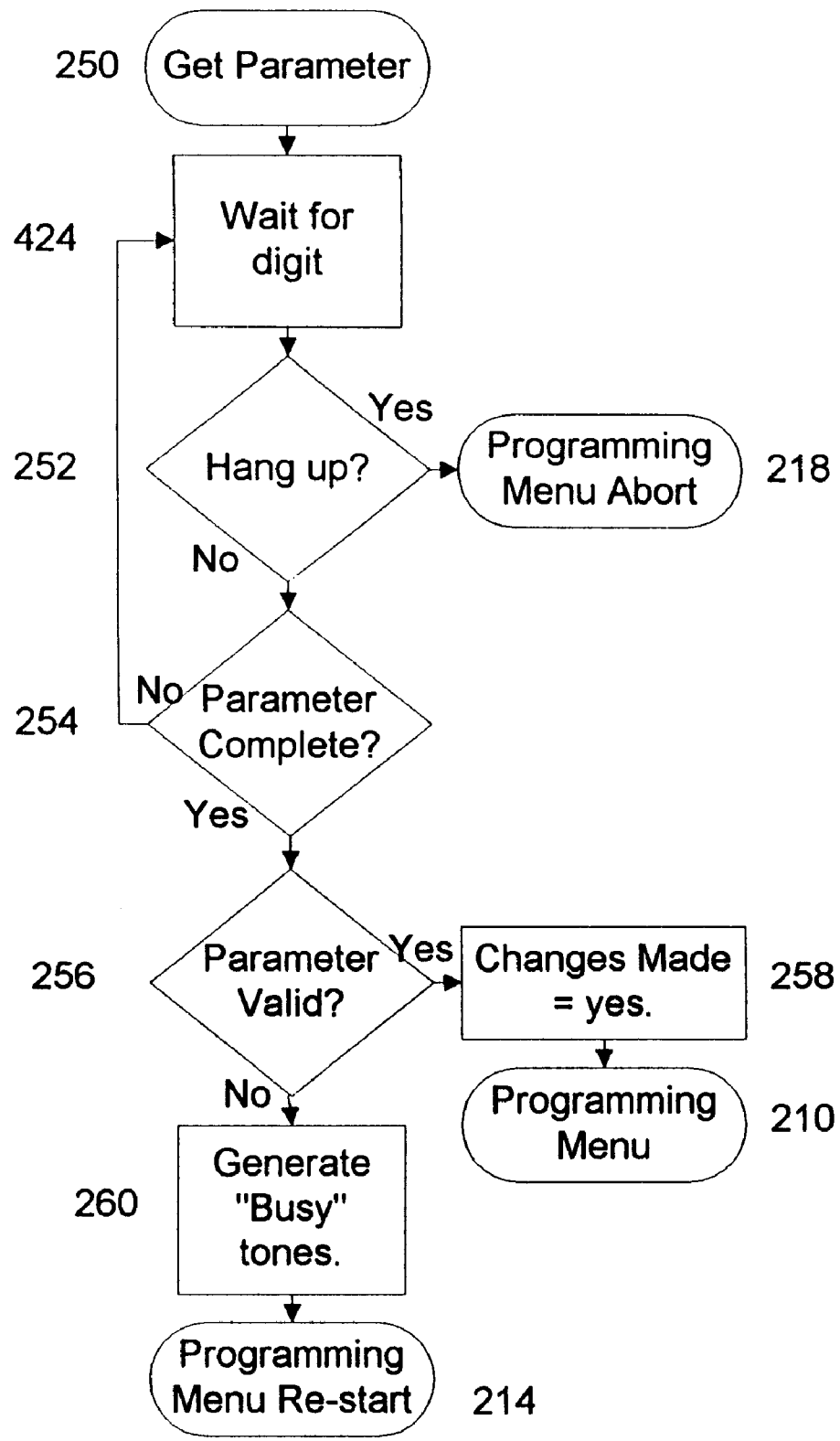

Referring now to FIGS. 2d and 2e, in the event that the ring type, ring number, time out period or access code is programmed, steps 234, 236 and 238 branch to get parameter procedure 250 shown in FIG. 2f. Step 250 first branches to step 424 where a digit entry is detected and then to step 252 which determines if the extension 12 has been hung up. If so, the programming menu is aborted at step 218. Otherwise, step 252 branches to step 254 which determines if the parameter inputted by the user is complete. If so, step 254 branches to step 256. Otherwise, step 254 branches back to step 424 to input the next digit.

Step 254 then branches to step 256 which determines if the parameter is valid. If so, step 256 branches to step 258 which sets a "changes made" flag used in step 220 to true and then returns to the programming menu 210. Otherwise, step 256 branches to step 260 which generates an error signal to the user and then the programming menu is restarted at step 214 (FIG. 2e).

Figure 2G:
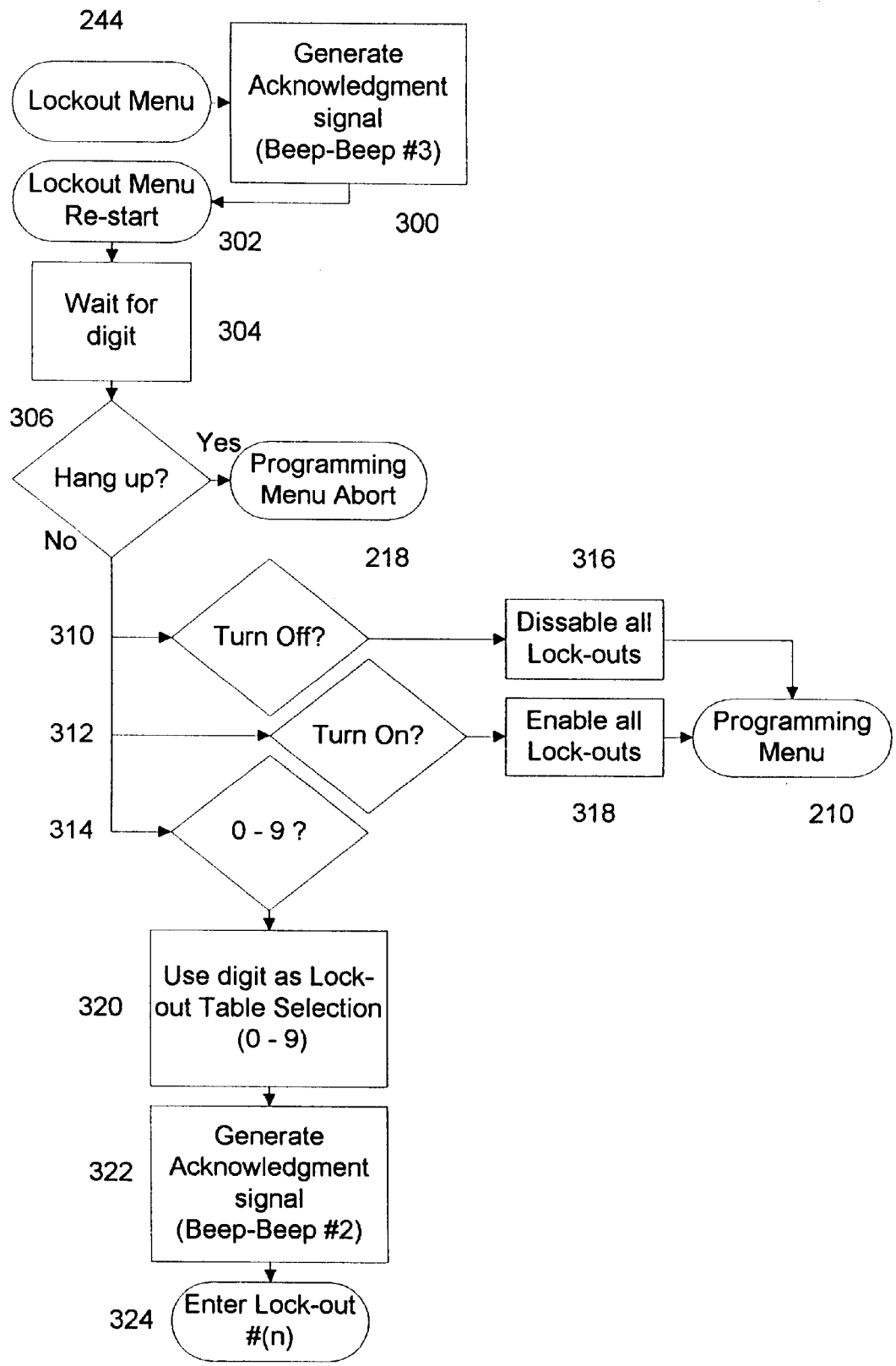

With reference now to FIG. 2g, the lock out menu routine 244 is there shown in greater detail. The lock out routine first branches to step 300 where the microprocessor 30 generates an acknowledgment signal through the call tone generator 37. Step 300 then branches to step 302 which initiates the menu restart and then to step 304 in which the user enters a signal from the touch tone telephone.

Step 304 then branches to step 306 which determines if a hang up condition has occurred as determined by the signal from the off-hook sensing circuit 40 from the extension. If so, step 306 branches to step 308 and aborts the lock out menu routine.

Otherwise, step 306 branches to steps 310, 312 and 314. At step 310, the lock out menu routine determines if a turn off signal has been inputted by the user. Such turn off signal could comprise, for example, entry of a pound key rather than a digit. If so, step 310 branches to step 316 and then returns to the programming menu 210 (FIG. 2d).

Similarly, step 312 determines if a turn on signal, such as the entry of the star key, has been entered by the user. If so, step 312 branches to step 318 which enables all of the lock outs presently inputted into the system and then branches to the programming menu routine 210.

Assuming, however, that a digit has been entered, step 314 branches to step 320 where the entered digit is used as a table selection number 0–9. The lock out table itself can contain up to ten different numbers or area codes and these lock out table entries are numbered 0–9. Step 320 then branches to step 322 where the microprocessor 30 generates an acknowledgment signal via the tone generator 37 and step 322 then enters the lockout routine 324.

Figure 2H:
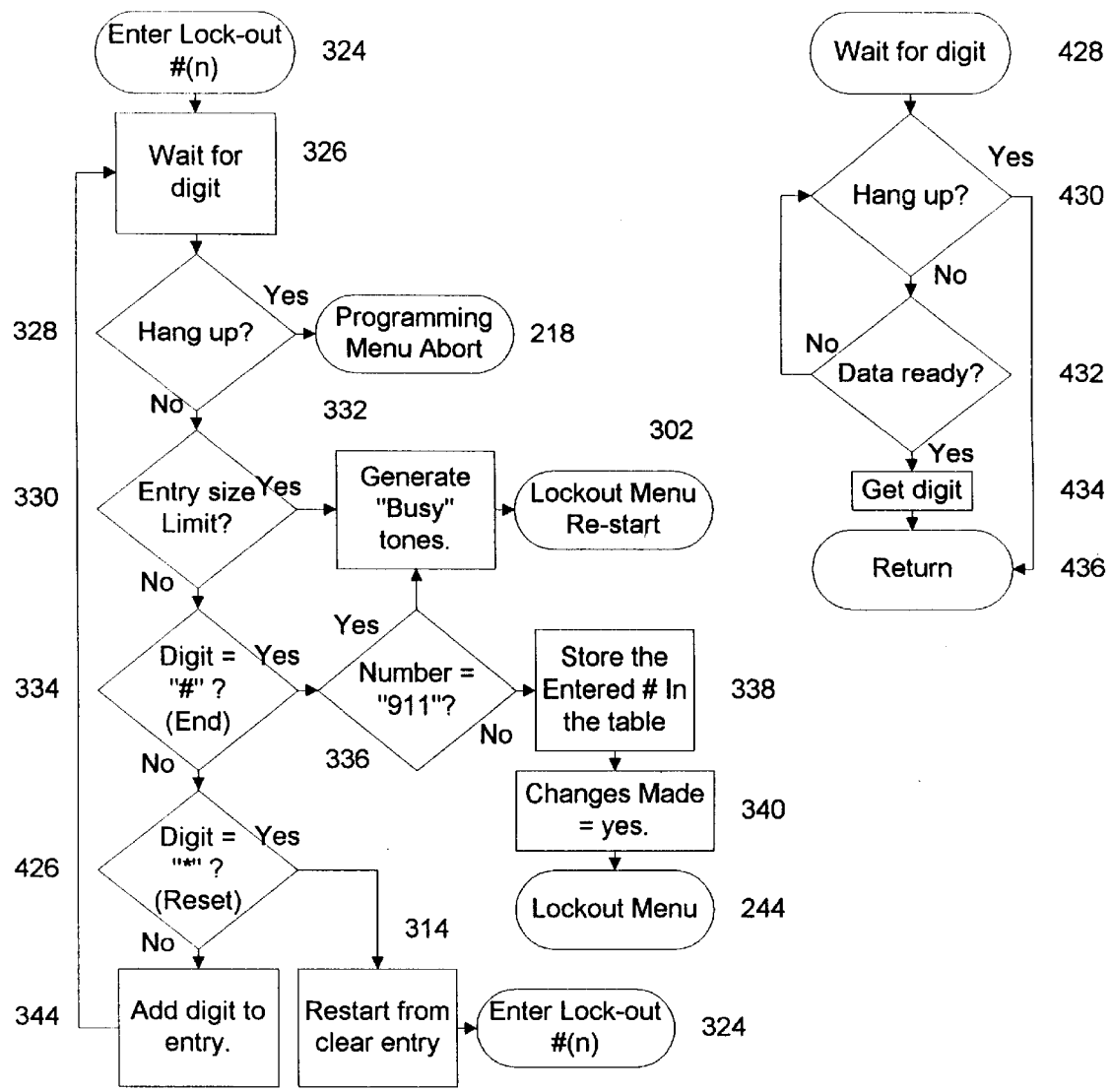

The lockout routine 324 is illustrated in FIG. 2h and executes the first step 326 where the system waits for the entry of a further digit from the extension keyboard. Step 326 then branches to step 328 which determines if the extension has hung up and, if so, branches to the programming menu abort routine 218. Otherwise, step 328 branches to step 330.

The digit input routine of step 326 is illustrated more clearly in FIG. 2*i*. At step 430 the program first determines if a hangup condition has occurred. If so, the routine exits via step 436. Otherwise, step 430 branches to step 432.

At step 432 the program determines if the input data is ready. If not, step 432 branches back to step 430. If the data is ready, step 432 branches to step 434 where the digit is inputted, and then returns via step 436.

Each of the ten entries in the lockout table can contain only a predetermined number of digits, for example four digits, typically representing one and an area code. At step 330, the program detects if this digit entry number has been exceeded and, if so, branches to step 332 in which the microprocessor 30 generates a busy or error signal to the user and then branches back to the menu restart 302.

The conclusion of any table entry is signified by the entry of a pound key by the user. Thus, assuming that the digit limit has not been exceeded, step 330 branches to step 334 to determine if the pound key has been entered. If so, step 334 branches to step 336 which determines if the entered number equals "911." For safety reasons, the entry of 911 as an entry in the lock out table is not permitted and, if entered, step 336 branches back to step 332 where an error signal is generated and then back to the menu restart at step 302.

Assuming that the entered number is not 911, step 336 instead branches to step 338 where the entered number is stored in the lockout table and then to step 340 where a changes made flag is set to true. Step 340 then branches back to the lockout menu routine 244 for the entry of a possible second number into the lockout table.

Assuming, however, that a pound key was not entered at step 334, step 334 instead branches to step 426 which determines if the asterisk key, indicative of a menu restart signal, has been entered. If so, step 426 branches to step 314 (FIG. 2*g*) where the lockout number is reentered. Otherwise, step 426 branches to step 344 where the entered digit is appended to the previously entered number and step 344 then branches to step 326 where the above process is repeated.

The lock out routine set forth in FIGS. 2*g* and 2*h* thus allows up to ten different entries to be made into the lockout table selection wherein each entry contains up to a predefined number of digits. Only the number 911, however, cannot be entered into the lockout table for safety reasons.

From the foregoing, it can be seen that the present invention provides an improved telephone switching circuit which is used for a residential telephone system having a number of telephone extensions. A primary feature of the present invention is that, in an idle condition, all of the telephone extensions are electrically connected with the external telephone line or channel in the normal fashion. Consequently, in the event of a power failure or failure of the telephone system, all of the telephones can be operated in their normal fashion to both receive and place incoming and outgoing telephone calls.

A still further advantage of the present invention is that, because of the internal channels in addition to the external channel employed by the system, up to three internal intercom calls can be made in addition to an outgoing telephone call simultaneously.

A still further advantage of the present invention is that incoming calls can be rapidly transferred by inputting a short code before expiration of the time out period and at any time thereafter by inputting the longer code associated with each of the telephone receivers.

Having described my invention, however, many modifications thereto will become apparent to those skilled in the art to which it pertains without deviation from the spirit of the invention as defined by the scope of the appended claims.

I claim:

1. For use with at least one external telephone line and a plurality of telephone extensions, each telephone extension having a plurality of buttons which, when depressed, generates an audio signal unique to the button, a control circuit for selectively establishing connection between said telephone extensions and/or said external telephone line comprising:

at least one internal channel and at least one external channel, said external telephone line being connected to said external channel, means for detecting an on- and off-hook status of each of said telephone extensions, means for detecting an incoming call on said external channel, switching means responsive to an off-hook status of a first extension and a coded audio signal generated by the buttons at said first extension to:

(1) selectively and exclusively connect said first extension and a selected second extension determined by said coded audio signal to said internal channel and to generate a ring signal to said second extension, or (2) connect said first extension to said external channel wherein said switching means further comprises means responsive to said coded audio signal to connect first extension and at least one other selected extension to said external channel in dependence upon said coded audio signal.

2. The invention as defined in claim 1 and comprising at least two internal channels.

3. The invention as defined in claim 1 wherein said switching means further comprises means responsive to said coded audio signal to transfer an incoming call from said first extension to a selected other extension in dependence upon said coded audio signal.

4. The invention as defined in claim 1 wherein said switching means further comprises means responsive to said coded audio signal to place an incoming call on hold.

5. The invention as defined in claim 1 and comprising means for storing a table of unauthorized telephone numbers, means for comparing a dialed number with telephone number entries in said table, and means for connecting the extension attempting to dial an unauthorized number in said table to said internal channel.

6. The invention as defined in claim 1 wherein said switching means comprises a microprocessor.

7. The invention as defined in claim 1 wherein a short audio code and a long audio code is associated with each extension, and means for enabling said short audio codes for a preset time period following an off-hook status of an extension and for enabling only said long audio codes thereafter.

8. The invention as defined in claim 1 wherein said switching means comprises means for connecting all of said extensions to said external channel during an on-hook status for all extensions.

9. For use with at least one external telephone line and a plurality of telephone extensions, each telephone extension having a plurality of buttons which, when depressed, generates an audio signal unique to the button, a control circuit for selectively establishing connection between said telephone extensions and/or said external telephone line comprising:

at least one internal channel and at least one external channel, said external telephone line being connected to said external channel, means for detecting an on- and off-hook status of each of said telephone extensions, means for detecting an incoming call on said external channel, switching means responsive to an off-hook status of a first extension and a coded audio signal generated by the buttons at said first extension to:
  (1) selectively and exclusively connect said first extension and a selected second extension determined by said coded audio signal to said internal channel and to generate a ring signal to said second extension, or
  (2) connect said first extension to said external channel wherein a short audio code and a long audio code is associated with each extension, and means for enabling said short audio codes for a preset time period following an off-hook status of an extension and for enabling only said long audio codes thereafter.

10. The invention as defined in claim 9 and comprising at least two internal channels.

11. The invention as defined in claim 9 wherein said switching means further comprises means responsive to said coded audio signal to transfer an incoming call from said first extension to a selected other extension in dependence upon said coded audio signal.

12. The invention as defined in claim 9 wherein said switching means further comprises means responsive to said coded audio signal to place an incoming call on hold.

13. The invention as defined in claim 9 and comprising means for storing a table of unauthorized telephone numbers, means for comparing a dialed number with telephone number entries in said table, and means for connecting the extension attempting to dial an unauthorized number in said table to said internal channel.

14. The invention as defined in claim 9 wherein said switching means comprises a microprocessor.

15. The invention as defined in claim 9 wherein said switching means comprises means for connecting all of said extensions to said external channel during an on-hook status for all extensions.

* * * * *